Patented Mar. 18, 1924.

1,487,020

UNITED STATES PATENT OFFICE.

ALWIN MITTASCH, ERNST WILLFROTH, AND OTTO BALZ, OF LUDWIGSHAFEN-ON-THE-RHINE, GERMANY, ASSIGNORS TO BADISCHE ANILIN & SODA FABRIK, OF LUDWIGSHAFEN-ON-THE-RHINE, BAVARIA, GERMANY, A CORPORATION OF GERMANY.

OXIDATION PROCESS.

No Drawing. Application filed April 24, 1922. Serial No. 556,327.

*To all whom it may concern:*

Be it known that we, ALWIN MITTASCH, ERNST WILLFROTH, and OTTO BALZ, citizens of Germany, residing at Ludwigshafen-on-the-Rhine, Germany, have invented new and useful Improvements in Oxidation Processes, of which the following is a specification.

The present invention relates to improvements in the catalytic oxidation of aromatic compounds, for example of hydrocarbons and consists in the use therefor of very suitable contact masses. We have found that contact masses containing oxids of boron or of phosphorus allow of transforming aromatic compounds and even hydrocarbons which are but difficultly attacked by oxygen, into products of an intermediary stage of oxidation, such as aldehydes or ketones, of high commercial value. The oxidation may be effected either with free oxygen, particularly with air, or with compounds capable of giving off oxygen such as carbon dioxid or oxids of nitrogen.

The contact masses according to the present invention can be prepared in most various ways. Oxids of boron or of phosphorus, most suitably boric, or phosphoric acid, or mixtures of both acids or salts of them may be employed and the said compounds may be distributed on carriers and additions may be made of other substances. The contact masses may be used either directly or after being heated to any suitable temperature. For example, boric acid may be reduced to a melt and silica, kieselgur, metallic oxids, carbonates, or nitrates be introduced into the melt, or carriers such as pieces of clay, fire-brick, magnesia or the like may be soaked with boric or phosphoric acid. Mixed catalysts may be prepared by introducing boric or phosphoric acid into molten metal salts, for example nitrates.

The compounds to be oxidized are passed over the heated catalytic mass in a gaseous or vaporized state together with an oxygen-containing gas, most properly air.

The following example will serve to further illustrate how the invention is carried into effect but the invention is not limited to the example.

A gas-mixture containing 85 parts, by volume, of ethylene and 15 parts, by volume, of oxygen is passed at about 375 degrees centigrade over a contact mass prepared by impregnating burnt clay with a solution of boric acid, or phosphoric acid, and heating subsequently, or by mixing boric acid, or phosphoric acid, or salts of them, with diatomaceous earth and heating to red heat. Formaldehyde is produced in ample quantities; it may be absorbed with water and the remaining gas carried again over the contact mass, after adding a fresh quantity of oxygen and the oxidation may thus be carried out in a circulating system, ethylene and oxygen being added either continuously or at intervals and the formaldehyde being absorbed from the reaction gases. The proportions of ethylene and oxygen may be varied, the amount of oxygen being preferably still more reduced. If methane be employed the temperature required must be about 200 degrees higher in order to cause oxidation. Formaldehyde is also produced by subjecting acetone, or ethyl alcohol vapors to the oxidation at about from 520 to 560 degrees centigrade, and it is also produced when passing air containing 1.7 per cent, by volume, of cyclohexane vapor over a catalyst of the type described at about 320 or 330 degrees centigrade. Air carrying two per cent, by volume, of anthracene vapor and passed over at about from 400–430 degrees yields a product rich in anthraquinone. Benzyl alcohol, when passed with about seven times its volume of air over a phosphoric acid contact mass at about from 250 to 300 degrees centigrade yields benzaldehyde. Ethyl alcohol with 20 volumes of air is converted with the same contact mass into acetaldehyde at from 250 to 300 degrees centigrade, and principally into formaldehyde when employing 380 to 400 degrees centigrade.

Generally speaking, oxids of boron and of phosphorus are equivalents for the purpose of the invention, and what we claim is:

1. The process of oxidizing organic compounds in a gaseous state catalytically with oxygen carrying gases, characterized by the use of a catalyst comprising an oxid of boron.

2. The process of oxidizing organic compounds in a gaseous state catalytically with oxygen carrying gases, characterized by the use of a catalyst comprising boric acid.

3. The process of producing formaldehyde by catalytically oxidizing ethylene gas with air, characterized by the use of a contact mass containing boric acid.

In testimony whereof we have hereunto set our hands.

ALWIN MITTASCH.
ERNST WILLFROTH.
OTTO BALZ.